US012765569B2

(12) United States Patent
Glenn, III et al.

(10) Patent No.: US 12,765,569 B2
(45) Date of Patent: Oct. 20, 2026

(54) FOOD PRODUCTS AND SYSTEMS AND METHODS OF MAKING SAME

(71) Applicant: Land O'Lakes, Inc., Arden Hills, MN (US)

(72) Inventors: Thomas Alexander Glenn, III, Arden Hills, MN (US); Leah T. Blasing, Arden Hills, MN (US); Tessie Rose Ewert, Arden Hills, MN (US)

(73) Assignee: Land O'Lakes, Inc., Arden Hills, MN (US)

( * ) Notice: Subject to any disclaimer, the term of this patent is extended or adjusted under 35 U.S.C. 154(b) by 0 days.

(21) Appl. No.: 19/131,861

(22) PCT Filed: Nov. 27, 2024

(86) PCT No.: PCT/US2024/057737

§ 371 (c)(1),
(2) Date: May 21, 2025

(87) PCT Pub. No.: WO2025/128336

PCT Pub. Date: Jun. 19, 2025

(65) Prior Publication Data

US 2026/0000088 A1 Jan. 1, 2026

Related U.S. Application Data

(60) Provisional application No. 63/665,388, filed on Jun. 28, 2024, provisional application No. 63/609,004, (Continued)

(51) Int. Cl.
*A23C 19/032* (2006.01)

(52) U.S. Cl.
CPC .................................. *A23C 19/032* (2013.01)

(58) Field of Classification Search
CPC ....... A23L 27/25; A23C 19/05; A23C 19/043; A23C 19/0328; A23C 19/032
(Continued)

(56) References Cited

U.S. PATENT DOCUMENTS 5,213,827 A 5/1993 Nauth et al.
5,378,478 A 1/1995 Miller et al.
(Continued)

FOREIGN PATENT DOCUMENTS

CN 101607887 B 3/2013
WO 2012060723 A1 5/2012
(Continued)

OTHER PUBLICATIONS

CheeseForum, Rennet and pH, Jan. 25, 2009, retrieved on Mar. 12, 2025 from https://cheeseforum.org/index.php?topic=839.0,.
(Continued)

*Primary Examiner* — Vera Stulii
(74) *Attorney, Agent, or Firm* — Dorsey & Whitney LLP

(57) ABSTRACT

Dairy products, such as cheese sauces, process cheese, dairy spreads, and methods and systems for producing such products are disclosed. A substantial portion of the product formulation is derived directly from milk, and methods include adjusting the protein, fat, lactose, and/or moisture content of the milk composition and then producing a fermentate from a lactic acid-producing culture and an enzyme including rennet over a fermentation tank filling period. The pH drop and final pH of the product is influenced by both the lactic acid-producing culture and rennet added during the filling period, and the pH may be controlled by adjusting the milk composition, the rennet and/or starter culture.

7 Claims, 6 Drawing Sheets

Related U.S. Application Data filed on Dec. 12, 2023, provisional application No. 63/608,971, filed on Dec. 12, 2023, provisional application No. 63/608,961, filed on Dec. 12, 2023, provisional application No. 63/608,951, filed on Dec. 12, 2023, provisional application No. 63/609,024, filed on Dec. 12, 2023, provisional application No. 63/608,985, filed on Dec. 12, 2023.

(58) Field of Classification Search
USPC .......................................................... 426/36
See application file for complete search history.

(56) References Cited

U.S. PATENT DOCUMENTS

| | | | |
|---|---|---|---|
| 11,337,435 | B2 | 5/2022 | Glenn et al. |
| 11,464,238 | B2 | 10/2022 | Zheng et al. |
| 11,707,072 | B2 | 7/2023 | Glenn et al. |
| 2005/0112238 | A1 | 5/2005 | Dias et al. |
| 2010/0062110 | A1 | 3/2010 | Elston et al. |
| 2011/0045132 | A1 | 2/2011 | Moran et al. |
| 2011/0123674 | A1 | 5/2011 | Wolfschoon et al. |
| 2012/0258198 | A1 | 10/2012 | Nielsen et al. |
| 2020/0359643 | A1 | 11/2020 | McPherson et al. |
| 2022/0132879 | A1 | 5/2022 | Glenn et al. |
| 2022/0256872 | A1 | 8/2022 | Curic-Bawden et al. |

FOREIGN PATENT DOCUMENTS

| | | | |
|---|---|---|---|
| WO | 2022157611 | A2 | 7/2022 |
| WO | 2023196351 | A1 | 10/2023 |

OTHER PUBLICATIONS

International Search Report and Written Opinion issued in International Application No. PCT/US2024/057737, mailed on Mar. 24, 2025, 17 pages.

International Search Report and Written Opinion issued in International Application No. PCT/US2024/057767, mailed on Jan. 28, 2025, 18 pages.

International Search Report and Written Opinion issued in International Application No. PCT/US2024/057779, mailed on Jan. 29, 2025, 11 pages.

Ibarra-Sanchez, et al., "Invited review: Advances in Nisin use for Preservation of Dairy Products", Journal of Dairy Sciences, vol. 103, No. 3, pp. 2041-2052, 2020, America Dairy Science Association.

Lauzin, et al., "Effect of pH Adjustment on the Composition and Rennet-Gelation Properties of Milk Concentrates Made from Ultrafiltration and Reverse Osmosis", Journal of Dairy Science, vol. 102, pp. 3939-3946, 2019, American Dairy Science Association.

Lin, et al., "Exopolysaccharides Production as Affected by Lactic Acid Bacteria and Fermentation Time", Food Chemistry, vol. 100, pp. 1419-1423, 2005, Elsevier Ltd.

FOOD PRODUCTS AND SYSTEMS AND METHODS OF MAKING SAME

CROSS-REFERENCE TO RELATED APPLICATIONS

This application is a 3.71 national phase entry of International Application No. PCT/US2024/057737, filed on Nov. 27, 2024, entitled "FOOD PRODUCTS AND SYSTEMS AND METHODS OF MAKING SAME," which in turn claims priority to U.S. Provisional Patent Application No. 63/608,951, filed Dec. 12, 2023, entitled "FOOD PRODUCTS AND SYSTEMS AND METHODS OF MAKING SAME," and U.S. Provisional Patent Application No. 63/608,961, filed Dec. 12, 2023, entitled "FOOD PRODUCTS AND SYSTEMS AND METHODS OF MAKING SAME", and U.S. Provisional Patent Application No. 63/608,971, filed Dec. 12, 2023, entitled "FOOD PRODUCTS AND SYSTEMS AND METHODS OF MAKING SAME", and U.S. Provisional Patent Application No. 63/608,985, filed Dec. 12, 2023, entitled "FOOD PRODUCTS AND SYSTEMS AND METHODS OF MAKING SAME", and U.S. Provisional Patent Application No. 63/609,004, filed Dec. 12, 2023, entitled "FOOD PRODUCTS AND SYSTEMS AND METHODS OF MAKING SAME", and U.S. Provisional Patent Application No. 63/609,024, filed Dec. 12, 2023, entitled "FOOD PRODUCTS AND SYSTEMS AND METHODS OF MAKING SAME", and U.S. Provisional Patent Application No. 63/665,388, filed Jun. 28, 2024, entitled "FLAVOR CHEESE PRODUCTS, FOOD PRODUCTS CONTAINING SUCH FLAVOR CHEESE PRODUCTS AND SYSTEMS AND METHODS OF MAKING SAME", each of which is incorporated by reference herein, in the entirety and for all purposes.

TECHNICAL FIELD

Dairy products and systems and methods for production of such dairy products are disclosed.

BACKGROUND

Bacterial fermentation of lactose in a dairy-derived starting material produces lactic acid and an attendant decrease in pH. Ingredients such as preservatives and emulsifiers are typically added to dairy products to maintain the desired characteristics, including desired flavor, aroma, appearance, consistency, texture, and./or meltability, of dairy products throughout their shelf life.

Dairy product producers continue to seek improved methods of production. Consumers continue to seek dairy products with fewer, and fewer artificial, added ingredients.

SUMMARY

According to implementations, a method of producing a dairy product involves adding an adjusted milk composition to a fermentation tank over a filling period, where the adjusted milk composition contains at least one of a reduced protein-to-fat ratio or a reduced lactose-to-fat ratio relative to a starting composition of milk, and where the fermentation tank is gradually filled with the adjusted milk composition over the filling period. During the filling period, the adjusted milk composition may be fermented to cause in situ production of lactic acid. The method may proceed by adding a plurality of doses of rennet during the filling period and while the adjusted milk composition is fermented.

In various implementations and alternatives, the plurality of doses of rennet may be added during a dosing period, which may extend over at least 10% of the filling period. In such cases, the filling period may include a first portion and a second portion following the first portion, and the dosing period may begin during the first portion of the filling period. In addition or alternatively, the rennet may be a rennet liquid concentrate dosed at a rate of at least about 0.00066 wt % of the adjusted milk composition during the dosing period. In examples, the method may further involve continuously agitating the adjusted milk composition within the fermentation tank at least during the dosing period. Such agitation may be via side sweep agitation. In some cases, during at least a portion of time of side sweep agitation, the method may further involve high shear mixing. In various examples, the method may further involve continuously agitating using a pump to shear and recirculate the adjusted milk composition into the fermentation tank at least during the dosing period.

In various implementations and alternatives, the method may further involve heating the adjusted milk composition after all or a portion of a fermentation period of the adjusted milk composition, where the heating may be to at least 105° F. In addition or alternatively, the adjusted milk composition may be fermented by a cheese culture, and/or prior to fermenting, the adjusted milk composition may be heat treated to a temperature of about 155° F. to about 175° F. and then cooled to a temperature of about 110° F. or about 86° F., and/or the adjusted milk composition may be a microfiltration concentrate having the reduced protein-to-fat ratio.

In various implementations and alternatives, the method may further involve adjusting a composition of the milk to form the adjusted milk composition. In such cases, prior to the adjusting, the method may further involve standardizing the milk with the addition of at least one of cream or skim milk and/or pasteurizing the milk. In addition or alternatively, at least a portion of milk minerals may be removed from the adjusted milk composition, and method may further involve adding a portion of the removed milk minerals to the product.

In various implementations and alternatives, the fermentation tank may be a first fermentation tank and the adjusted milk composition may be fermented to produce a first fermentate, and the method may further involve: adding the adjusted milk composition to a second fermentation tank over a filling period of the second fermentation tank, where during the filling period the adjusted milk composition is fermented to cause in situ production of lactic acid; and adding a plurality of doses of rennet during the filling period, and while the adjusted milk composition is fermented to produce a second fermentate. In such cases, the method may further involve combining the first fermentate and the second fermentate in a continuous process to produce a combined fermentate. In such cases, the method may further involve at least one of adjusting a moisture content or cooking the combined fermentate.

According to further implementations, a method of producing a dairy product may involve adding an adjusted milk composition to a fermentation tank over a filling period, where the adjusted milk composition contains at least one of a reduced protein-to-fat ratio or a reduced lactose-to-fat ratio relative to a composition of milk, and where the fermentation tank is gradually filled with the adjusted milk composition over the filling period. During the filling period the adjusted milk composition may be fermented to cause in situ production of lactic acid. The method may then involve adding a continuous or an intermittent stream of rennet during the filling period and while the adjusted milk composition is fermented. In such implementations, the rennet may be added during a rennet addition period, which may extend over at least 10% and up to 90% of the filling period.

In various implementations and alternatives, the added rennet causes production of free hydrogen ions to thereby reduce a pH of the fermenting adjusted milk composition. In some cases, a first concentration of rennet is added in the continuous or the intermittent stream during a first portion of the filling period, and a second concentration of rennet different from the first concentration is added in the continuous or the intermittent stream during a second portion of the filling period. In such cases, the added second concentration of the rennet changes a rate of pH change relative to the first concentration of rennet while the adjusted milk composition is fermented.

In various implementations and alternatives, after a first portion of the adjusted milk composition is added to the fermentation tank during a portion of the filling period, another, second portion of an adjusted milk composition is added to the fermentation tank during another portion of the filling period, which has a different protein-to-fat ratio or a different lactose-to-fat ratio relative to the first portion. In some cases, the modified another portion of the adjusted milk composition has a reduced lactose-to-fat ratio relative to the composition of milk. In some cases, the adding of the modified another portion of the adjusted milk composition to the fermentation tank adjusts a rate of production of the in situ production of lactic acid.

According to yet further implementations, a method of producing a dairy product involves, causing a milk composition to be fermented over a filling period in which a fermentation tank is gradually filled with the milk composition, wherein in situ production of lactic acid results in a first pH drop in the fermenting milk composition; and causing the milk composition to undergo a concurrent, second pH drop by adding rennet to the fermenting milk composition in a continuous or an intermittent stream during the filling period, wherein the rennet causes production of free hydrogen ions to thereby cause the second pH drop.

Implementations and alternatives may further involve adjusting a rate of pH drop or a final pH by adjusting a concentration of the added rennet in the continuous or intermittent stream. In addition or alternatively, prior to causing the milk composition to be fermented, the milk composition may be adjusted to a different protein-to-fat ratio or a different lactose-to-fat ratio relative to a composition of milk.

Implementations and alternatives may further involve determining a projected pH drop at least by the added rennet; and based on the determination, modifying a rate of pH drop or a final pH by one or more of: adjusting an amount of rennet added, adjusting lactose in the milk composition, or adjusting an amount of an added starter culture. Such cases may further involve allowing lactose in the milk composition to be fermented to a final pH thereby forming a fermentate, wherein the fermentate includes a residual amount of lactose. In addition or alternatively, the projected pH drop may be further determined based on addition of a starter culture to cause the in situ production of lactic acid.

In some cases, projected pH drop in the fermenting milk composition may be determined at least by addition of a starter culture; and based on the determination, modifying a rate of pH drop or a final pH by one or more of: adjusting an amount of rennet added, adjusting lactose in the milk composition, or adjusting an amount of an added starter culture.

DETAILED DESCRIPTION

Figure 1A:
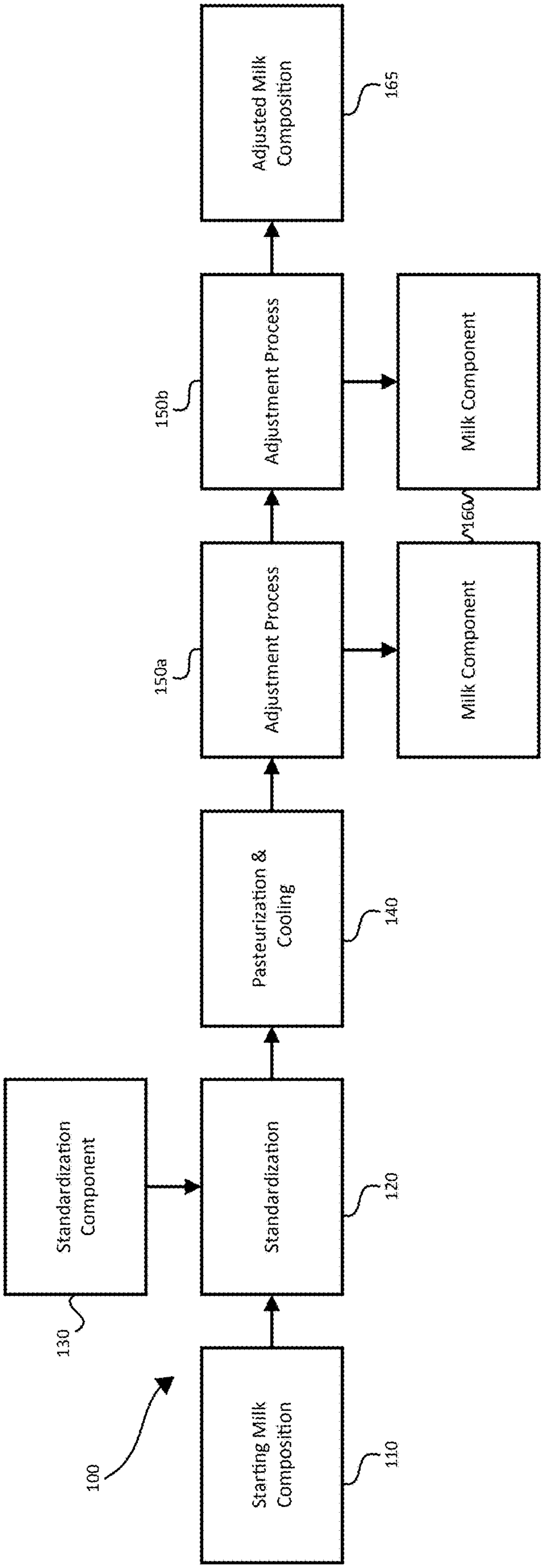
FIGS. 1A-1B are schematics of methods disclosed herein.

Implementations are directed to methods of producing dairy products in a continuous, nearly continuous, or semi-continuous manner, and may include production within a timeframe of up to 24 hours after milk standardization and pasteurization. Dairy products may include but are not limited to cheese, process cheese, ingredient cheese, cheese sauces, heat-treated cheese sauces, pasteurized cheese sauces, process cheese, pasteurized process cheese, dairy spreads, pasteurized process cheese spreads, pasteurized process cheese products (e.g., process cheese loaf and process cheese spread products), pasteurized process cheese food, pasteurized process cheese product or pasteurized blended cheese, and precursors or intermediates to production of any of the foregoing.

Milk compositions used in producing the dairy products of the present disclosure may include liquid whole milk, reduced fat milk, skim milk, cream, ultrafiltered milk, microfiltered milk, buttermilk, condensed skim milk, condensed whole milk, condensed buttermilk, or mixtures thereof, in liquid or dried forms and rehydrated mixtures thereof. Additionally or alternatively the milk be pasteurized. Additionally or alternatively the milk be concentrated liquid milk. Any disclosed dairy product may exclude one or more of the foregoing milk forms. For example, a disclosed dairy product may be free of skim milk.

The milk compositions may be pasteurized and/or standardized. Pasteurization of milk involves heating the milk at temperatures and holding times that destroy pathogens, such as *Listeria* and *Salmonella*, present in raw milk. For example, pasteurization may be conducted at 145° F. for 30 minutes or 161° F. for 15 seconds. Pasteurization may be performed prior to further adjustment or processing, as described herein. Standardization of milk may involve the addition of cream to reach a target fat-to-protein ratio. In some examples, a blend of milk (e.g., raw milk) and cream and/or skim milk result in a raw standardized milk with a desired fat-to-protein ratio, for instance based on standard identity requirements of the dairy product(s) being produced, along with texture, melt and application characteristics/considerations of a final dairy product being produced. Standardized milk may be pasteurized at high temperature short time (HTST) conditions (e.g., at a temperature of greater than or equal to 161° F. for 15 seconds) and cooled to approximately 130° F. (e.g., 126° F. +/−4° F.) before further processing of the milk composition, as described herein.

Adjustment of Milk Compositions

The starting milk compositions disclosed herein may be subjected to a milk composition adjustment process, such as by removing at least a portion of one or more milk components. For example, protein, protein-containing components (e.g., whey and casein), fat, lactose, minerals, solids nonfat, water, or combinations thereof, may be removed from the milk composition. Adjustment processes to produce adjusted milk compositions may include but are not limited to microfiltration, ion exchange, centrifugation, vat processing, enzyme treatment, ultrafiltration, reverse osmosis, nanofiltration, evaporation, and addition of dairy components each as described in more detail herein.

The milk composition adjustment processes may remove at least a portion of the aforementioned milk components while retaining others. For example, removal of at least a portion of one or more milk components from the milk composition, e.g., the starting milk composition, may prepare a dairy stream for subsequent processing steps in which retention of the remaining milk components is desired through the production process. In some cases, the remaining milk components may be retained in an intermediate product, or both in the intermediate and a final product. In some embodiments, the adjustment process may remove at least a portion of whey protein and/or lactose from the milk compositions. For instance, the adjusted milk composition may have both a reduced protein-to-fat ratio and a reduced lactose-to-fat ratio relative to a starting milk composition. As disclosed herein, removal of at least a portion of the whey protein may help produce final products with improved properties compared to final products that retain more whey proteins. For instance, removal of whey protein may facilitate avoiding negative impacts during processing and may improve product performance characteristics (e.g., undesirable flavors, texture and melting characteristics). Removal of whey protein while retaining fat may prepare the dairy stream for production of dairy products with an adjusted ratio, e.g., a reduced protein-to-fat ratio or a higher fat-to-protein ratio. Removal of at least a portion of lactose from the milk compositions may prepare the dairy stream for further processing steps, as disclosed herein. Lactose reduction may facilitate controlling the amount of lactic acid and/or final pH during subsequent processing, such as fermentation, as provided herein. Removal of lactose while retaining fat may also prepare the dairy stream for production of dairy products with an adjusted nutrient ratio, e.g., a reduced lactose-to-fat ratio or a higher fat-to-lactose ratio. Removal of at least a portion of fat from the milk compositions may prepare the dairy stream for production of dairy products with an adjusted, e.g., a higher, protein-to-fat ratio. Removal of at least a portion of the water from the milk compositions such as through evaporation, microfiltration or ultrafiltration may prepare the milk stream for further processing, as disclosed herein.

Microfiltration

Microfiltration of milk results in removal of whey protein (e.g., serum protein), lactose, water, and minerals. For example, microfiltration of whole milk results in retention of native milk fat globules along with other milk components while removing at least a portion of the whey, lactose, and minerals via the permeate stream, which may provide improved dairy products as disclosed herein. Adjusting the milk composition via microfiltration may additionally involve one or more diafiltration steps based on the desired level of extraction of the whey protein and lactose. For example, water may be added to the microfiltered retentate before subsequent filtration to further reduce the concentration of lactose and minerals. The number of diafiltration steps may depend on the desired properties of the microfiltration retentate and the final product. The adjusted milk composition may thus be the retentate of the microfiltration and optional diafiltration steps and may include fat, and a portion of the initial protein, lactose, mineral, and moisture content from the milk. The milk may be non-acidified or acidified prior to filtration, such as by the addition of edible acids or enzymes such as citric acid, acetic acid, lactic acid, protease, carbon dioxide, or lipase. Acidification of milk prior to microfiltration may result in an increased amount of calcium being transferred to the permeate. Microfiltration may be conducted at about 120° F. to about 140° F., such as about 125° F. to about 135° F.

In some implementations, a starting milk composition such as pasteurized and standardized milk may be subjected to a microfiltration process that includes diafiltration water addition, where a portion of the lactose and whey are removed. Concentration through microfiltration may concentrate by approximately 5.5 times, or a volume reduction to approximately 18.2% of its initial volume. Diafiltration in combination with microfiltration may further reduce the lactose and whey protein what would otherwise be possible with the concentration process alone.

Ion Exchange

Ion exchange may be used to remove selections from the milk composition and/or concentrate select ions in the milk composition. Accordingly, ion exchange processes may be used to form ion-depleted or ion-enriched milk compositions. The milk composition may be loaded on to an ion-exchange column to bind and/or pass select cations or anions. For example, any one or more of calcium, sodium, potassium, chloride, phosphate, and citrate may be bound to or passed through an ion exchange column. When a desired ion is bound to a column, it may be eluted with an eluent and collected. In addition or alternatively, nanofiltration may be used to remove ions from the milk composition and/or concentrate select ions in the milk composition.

Centrifugation

Centrifugation may be used to remove fat from the milk composition and/or concentrate select ions in the milk composition.

Vat Removal

Vat processing may involve adding cultures or enzymes (e.g., rennet) to milk in a vat where the cultures and/or enzymes cause a physical phase change, e.g., coagulation of the milk, and whey may be separated from the curd.

Enzyme Treatment

Enzymes may convert lactose to galacto-oligosaccharides and monosaccharaides. For instance, lactase, may be added to milk compositions to hydrolyze lactose into its constituent sugars-glucose and galactose. As provided herein, some lactose in the component-adjusted milk may be retained, and the enzymatic activity may be controlled by, for example, heat treatment to denature the enzyme prior to complete hydrolysis of the lactose. In addition or alternatively, lactase treatment at reduced temperatures and/or at a reduced pH may slow lactose conversion.

Ultrafiltration

Ultrafiltration may remove at least some moisture, minerals and lactose from a milk composition while retaining all proteins, including whey proteins, as well as fat. Consequently, in ultrafiltration of milk, the ratio of fat: casein: whey protein is the same as that in milk. Similarly, performing other milk composition adjustment processes to produce an adjusted milk composition prior to ultrafiltration may result in retention of the same protein and fat ratios as in the adjusted milk composition. For example, where whey and lactose are removed in an adjustment process such as microfiltration, a subsequent step of ultrafiltration may maintain the same ratio of protein and fat from the microfiltration retentate while removing a portion of moisture and lactose.

Reverse Osmosis

Reverse osmosis removes at least some moisture, from a milk composition while retaining other components. Accordingly, reverse osmosis may help produce concentrated milk compositions in which the total solids concentration has been increased. For example, reverse osmosis may produce a concentrated milk composition having about 25 wt % to 30 wt % total solids.

Nanofiltration

Nanofiltration removes at least some moisture and minerals and salts from a milk composition while retaining other components. Accordingly, nanofiltration may help produce concentrated milk compositions in which the total solids concentration has been increased. For example, nanofiltration may produce a concentrated milk composition having about 25 wt % to 30 wt % total solids.

Evaporation

Evaporation removes at least some moisture from a milk composition while retaining all other components. Accordingly, evaporation may help produce concentrated milk compositions in which the total solids concentration has been increased. In some implementations, evaporation may be conducted using a wiped-film evaporator, such as a GMM Pfaudler wiped-film evaporator for small scale settings. The evaporator may operate under vacuum, typically set to an absolute pressure between 40 mmHg and 25 mmHg. Evaporation may occur via heat transfer from a heated jacket, set between 140° F. and 180° F. with the heating media set as water, oil, or vacuum steam, transferred to a turbulent, thin layer of product in the evaporative section of the evaporator. A turbulent, thin layer may be achieved via a rotor within the evaporator, and for example the rotor may operate at a speed between 160-200 RPM in a small-scale setting. The product fed into the evaporator may have a total solids of 42% and 44%, at a temperature of about 85° F. to about 95° F. The concentrated product may exit the evaporator, at a temperature between 70° F. and 90° F., for instance depending on the operating vacuum pressure. The total solids of the product exiting the evaporator may be about 63% to about 67% total solids. It will be appreciated that evaporation may be conducted in large scale settings to remove moisture and achieve the desired target solids content while retaining other components, according to the present disclosure.

Addition of Dairy Components

In further implementations, the milk composition may be adjusted by adding dairy components to the composition. For example, one or more of protein, protein-containing components (e.g., whey and casein), fat, lactose, solids nonfat, milk protein concentrate (MPC), and water, or combinations thereof, may be added to the starting milk composition to produce an adjusted milk composition that differs from the starting milk composition.

Accordingly, implementations may involve adjusting a milk composition such that an adjusted milk composition contains different ratios of milk components compared to the original milk composition. For example, the adjusted milk composition may have a reduced protein-to-fat ratio and/or a reduced lactose-to-fat ratio relative to the starting milk composition, such as whole milk.

Each adjustment process may be conducted at a suitable temperature and pressure, which may be an elevated temperature and/or pressure. For example, an adjustment process may be performed at about 125° F. to about 180° F., about 155° F. to about 175° F., about 140° F. to about 170° F., about 140° F. to about 180° F., or about 160° F. to about 180° F. An adjustment process may be performed at about 24 to about 29.4 inches of mercury. In some implementations, the adjustment process may additionally include cooling the adjusted milk composition to a temperature of about 70° F. to about 94° F. Adjustment through filtration may be up to 100 psig (gauge pressure), but may also be conducted at lower pressure while simultaneously achieving adjustment through evaporation.

Example Process

An example of milk composition preparation and adjustment process is provided in FIG. 1A. In the method 100, a starting milk composition 110, such as raw whole milk, is standardized 120 by the addition of one or more standardization components 130, such as cream and/or skim milk, to a targeted fat-to-protein ratio based on the desired final product composition. The standardized milk composition is then pasteurized and cooled 140, such as to about 130° F. Then composition is then subjected to milk composition adjustment processes 150*a*, 150*b*, such as microfiltration and diafiltration, which causes the removal of at least one milk component 160, such as whey protein. The milk composition adjustment processes 150*a*, 150*b* lead to production of an adjusted milk composition 165.

In some implementations, following the adjustment of the milk composition by one or more of the disclosed processes, no dairy or milk component or composition (e.g., cream or skim milk) is added to or removed from the adjusted milk composition, other than the removal of moisture, until the finished product has been produced. In some implementations, no dairy or milk component or composition is added to or removed from the adjusted milk composition at least until fermentation and/or enzyme treatment, each as disclosed herein, is complete. Such minimal processing may help retain features of the adjusted milk composition that are desirable for conducting downstream processing steps such as fermentation or enzyme treatment, including the development of desirable products of those processing steps. Table 1 provides ranges of milk components in an example starting milk composition compared to an example adjusted milk composition produced by microfiltration.

TABLE 1

| Milk Component | Expected wt % Range Starting Milk Composition | Desired wt % Range Adjusted Milk Composition microfiltration) |
|---|---|---|
| Total solids | 12.00-15.00 | 37.00-46.00 |
| Fat | 3.30-5.50 | 20.00-27.00 |
| SNF | 6.50-11.70 | 10.00-26.00 |
| Protein | 2.95-3.75 | 12.00-16.00 |
| Whey | 0.40-0.65 | 0.40-1.95 |
| Casein | 2.40-2.85 | 10.00-15.00 |
| Lactose | 4.10-5.10 | 0.70-1.60 |
| Water | 85.00-88.00 | 54.00-63.00 |

Benefits of Adjusting Milk Compositions

The milk composition adjustment processes disclosed herein yield improved final products compared to other production methods performed in the absence of the disclosed adjustment processes. In some implementations, the adjustment processes reduce or remove whey proteins, such as by microfiltration of the starting milk composition, and the resulting final products have improved properties compared to products in which whey proteins have not been removed from the intermediate or final products. Improved properties may include one or more of better flavor, better texture, desired consistency, and desired melt characteristics.

For example, use of the disclosed adjusted milk compositions in cheese sauce final products, such as finished pasteurized cheese sauces or heat-treated cheese sauce products for food service operations, may produce cheese sauces with a desirable smooth consistency upon reheating. In contrast, ultrafiltration retains whey proteins from a starting milk composition in an intermediate concentrated product. When such intermediate concentrated product is used in cheese sauce final products, reheating of the cheese sauce products may denature the retained whey proteins. Denaturation may cause an undesirable flocculated or chunky, mashed potato-like consistency in the cheese sauce instead of the desired smooth consistency.

Additionally or alternatively, use of the disclosed adjusted milk compositions in process cheese and process cheese spreads may produce such products with desirable flavors and textures. In contrast, denaturation of the retained whey proteins during a cooking process may result in undesirable flavor and textures and melt restriction. Retained whey proteins may also denature during an evaporation process while producing process cheese and process cheese spreads, which may result in protein agglomeration or aggregation and a concomitant undesirable gritty or chalky texture.

Fermentation and Fermentate Production

Figure 1B:
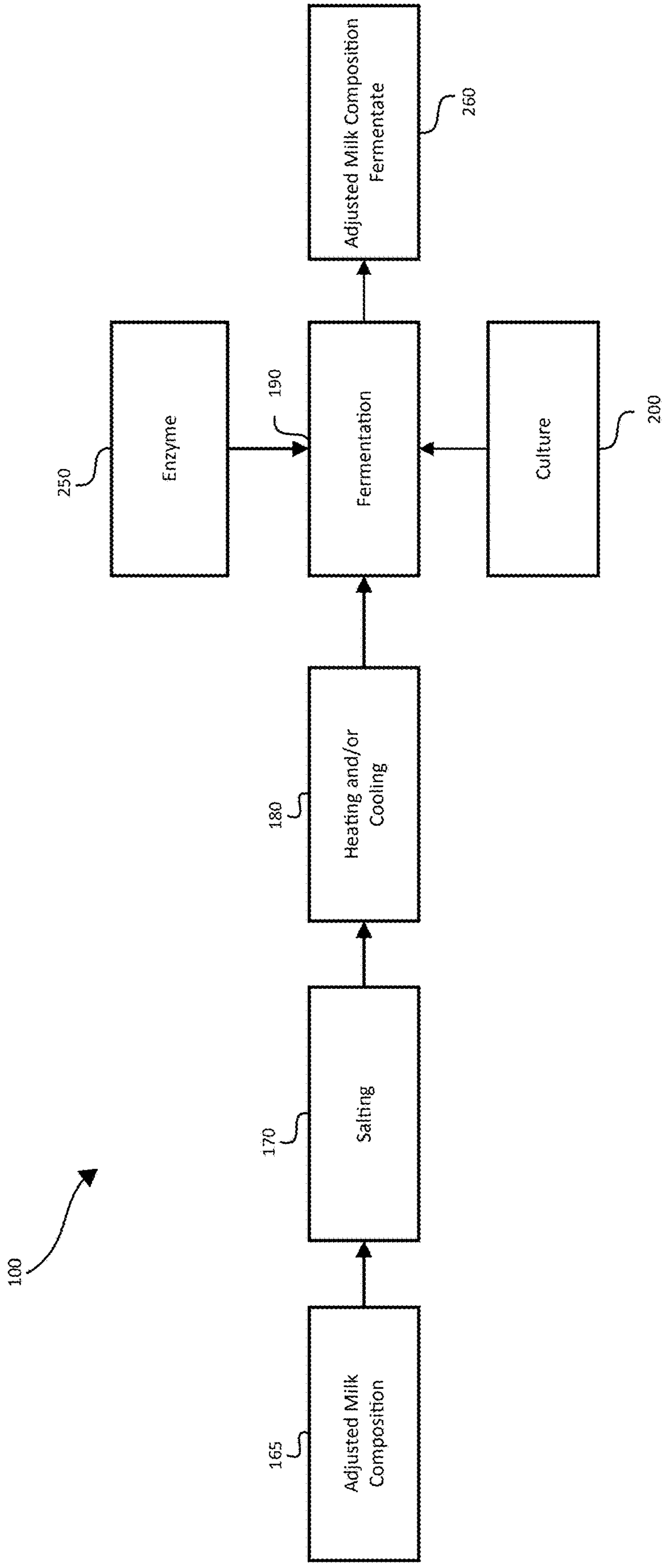

With reference to FIGS. 1A and 1B, following one or more milk composition adjustment processes 150*a*, 150*b*, the adjusted milk composition 165 may be salted 170, e.g., at about 2.0 to 3.0, or about 2.7 wt % on a dry basis. Salting the adjusted milk composition may help stabilize the adjusted milk composition during subsequent processing steps, such as fermentation. For instance, a salted microfiltration concentrate may facilitate avoiding phase separation during fermentation. In some implementations, salt may be added at elevated processing temperatures such as about 110° F. to about 140° F. to aid in the solubility of the salt during the addition process. Salting may also reduce the viscosity of the adjusted milk composition and intermediate materials produced during the production of the dairy products.

The adjusted milk composition may additionally or alternatively be heat-treated and/or cooled 180 to reduce the microbiological counts of any thermoduric or thermophilic bacteria that may present prior to subsequent culturing/fermentation process. Heat treatment may be to about 155° F. to about 175° F., such as 165° F. for 15 seconds with a minimum of 162° F., which may be followed by cooling to about 86° F. for mesophilic lactic acid bacteria or to about 110° F. for thermophilic lactic acid bacteria. Heat treatment after salting may help reduce the number of bacteria that may have grown during the milk composition adjustment process, such as when the milk composition adjustment process is conducted at an elevated temperature. Cooling the adjusted composition after heat treatment may help prepare the composition for fermentation, such as by reducing the temperature of the composition such that the residual heat will not damage or kill the cultures for fermentation. In one example, the adjusted composition is a microfiltration concentrate, and it is salted, heat-treated, and cooled prior to fermentation. The salt may help the microfiltration concentrate avoid phase separation during fermentation.

The adjusted composition 165, with or without salting 170, and heat-treating and/or cooling 180, may be added to one or more fermenters for fermentation 190 by one or more cultures 200, which includes a lactic acid producing culture, such as a cheese culture. Cheese cultures may be a bacterial culture or cultures capable of converting residual lactose in the adjusted milk composition to lactic acid. The cheese cultures may be added as pellets, such as frozen pellets. Example cheese cultures include the lactic acid producing culture *Lactococcus lactis* subsp. *cremoris* and *Lactococcus lactis* subsp. *lactis* (e.g., FC-211 from DSM Food Specialties B.V.). Other examples of cheese cultures may include nisin-producing lactic acid bacteria, such as *Lactococcus lactis* subsp. *Cremoris*, e.g., (D 029 from CSK Food Enrichment C.V.)

Fermenters such as fermentation tanks may be gradually filled with the adjusted milk composition over a filling period. As the adjusted milk composition is added over the course of the filling period, the adjusted milk composition is fermented 190 by the one or more cultures 200 to cause in situ production of lactic acid. For instance, the filling period may extend for about 2 to about 9 hours, such as about 2, 3, 4, 5, 6, 7, 8, or 9 hours, or about 2 to about 8, about 3 to about 8, about 4 to about 8, about 5 to about 8, about 2 to about 6, about 3 to about 6, about 4 to about 6, about 3 to about 9, about 4 to about 9, about 5 to about 9, or about 6 to about 9 hours, and fermentation 190 may occur during all or a portion this time, and fermentation 190 may continue after the filling period such as for about 0 to about 8 hours, such as about 10, 20, 30, 40, 50, 60, 70, 80 or 90 minutes, or about 2, 3, 4, 5, 6, 7, or 8 hours, depending on the tank filling time. For instance, if the tank filling time is 4 hours, it might take up to 8 hours to achieve a desired final pH, for an additional four hours of fermentation after the filling period. If the tank fill time is 9 hours the desired pH may be achieved during filling and thus no further fermentation may be needed after filling. Fermentation may occur in batches and fed-batches.

In some examples, the fermenter may be partially filled with the adjusted milk composition prior to fermentation 190 by the addition of the cultures 200. For instance, at least about 5%, such as 10%, 15% or more of the fermenter may be filled with the adjusted milk composition prior to the addition of the culture or cultures 200. Alternatively, the culture or cultures 200 may be added at the beginning of the filling period when the fermenter is first filled with the adjusted milk composition.

According to the present disclosure, rennet and/or other enzymes 250 (See FIG. 1B) may be added to the fermenter. The rennet and/or other enzymes may be added as a solution. The following discussion refers to rennet alone but it will be understood that other enzymes may be added to the fermenter in addition or as an alternative to rennet. Other enzymes may include but are not limited to proteases, hydrolases such as lactase, lipases such as phospholipases, and deaminases such as glutaminase, protein glutaminase, glutamate dehydrogenase, and monoamine oxidase. Such other enzymes may be added in dry or liquid form.

Rennet may be added in doses or in a stream, such as a continuous stream or an intermittent stream. For instance, a plurality of doses of rennet may be added during the filling period, and while the adjusted milk composition is fermented. For instance, rennet may be added in doses or intermittently once every minute during a dosing period or a rennet addition period, or once every 10, 20, 30, 40, 50, 60, 70, 80, 90, 100, 110, or 120 seconds during the dosing period or rennet addition period. Once the dosing or rennet addition period begins, the rennet may be dosed, e.g., injected as a pre-defined doses, or added as a continuous or intermittent stream for the duration of the filling period, or for a portion thereof. In some implementations, the dosing or rennet addition period may continue after the filling period ends. In some examples, the dosing or rennet addition period may run concurrently with the entire filling period. Alternatively, the dosing or rennet addition period may run for 5% to 90% of the filling period, such as about, or at least about, 5%, 10%, 15%, 20%, 25%, 30%, 35%, 40%, 45%, 50%, 55%, 60%, 65%, 70%, 75%, 80%, 85%, 90%, or 95% of the filling period, or about 10-90%, 10-50%, 50-90%, 20-60%, 60-90%, 30-70%, 70-90%, 10-40%, 40-90%, or any range between the aforementioned filling period percentages.

All or at least a portion of the dosing or rennet addition period may overlap with the filling period. For instance, the dosing or rennet addition period may continue after the filling period has ended. In examples, the filling period may include a first portion and a second portion following the first portion, and the dosing or rennet addition period may begin during the first portion of the filling period. For instance, the first portion may be the first half of the filling period, and the second portion may be the second half of the filling period, and the dosing or rennet addition period may begin during the first half of the filling period.

The doses may be added during a dosing period, and the dosing period may coincide with all or a portion of the filling period. The dosing period may involve dosing the rennet at regular time intervals such as using a pump, e.g., a peristaltic pump. Dosing may be continuous, e.g., the time intervals may be the same over the dosing period. Similarly, the rennet may be added intermittently using a peristaltic pump during the rennet addition period. Continuous addition of rennet may be by an infeed line that continuously feeds a supply of rennet to the fermenter.

For instance, the rennet may be injected into a processing line feeding into the fermenter. In examples, the rennet may be injected into the same processing line carrying the adjusted milk composition to the fermenter, e.g., the fermentation tank.

In some examples, rennet 250 may be added to the adjusted milk composition prior to, at the same time as, or after the culture or cultures 200 are added. For instance, once the culture or cultures 200 are added to the fermenter, the dosing of, or the stream of, rennet 250 may begin.

The concentration of the rennet may be selected based on a desired degree of thickening/increase in viscosity and, as described below, may additionally or alternatively be selected based on a time when peak viscosity occurs before the thinning phenomenon occurs The rennet may be delivered (e.g., dosed or provided in a continuous stream) in a solution at a rate of at least about 0.02 wt % of the adjusted milk composition during the dosing or rennet addition period, or at least about 0.02 wt % to about 0.6 wt %. The rennet may be provided as a rennet solution and may be a mixture of a rennet liquid concentrate in water. The rennet liquid concentrate may be a liquid chymosin preparation derived from a selected strain of the dairy yeast *Kluyveromyces lactis* (e.g., Maxiren D/S). The rennet liquid concentrate may be about 0.00066 wt % to about 0.02 wt %, about 0.00165 wt % to about 0.0132 wt %, about 0.0033 wt % to about 0.0099 wt %, about 0.005 wt % to about 0.00825 wt % of the adjusted milk composition, or about 0.0066 wt % of the adjusted milk composition. The rennet liquid concentrate may have a minimum clotting activity per lb. of the adjusted milk composition of about 1.65 to about to 49.6 ICMU/ml (International Milk Clotting Unit/ml), or about 16.52 ICMU/ml, where one milk-coagulating unit (U) is defined as the amount of the rennet enzyme that coagulates 10 mL of reconstituted skimmed milk powder at 30° C. in 100 seconds.

During fermentation 190, particularly during the filling period, it has been discovered there is a significant thickening effect that occurs within the enzyme-treated, fermenting adjusted milk composition, but no isotropic gelling process occurs like in conventional cheese making vats. Rather, surprisingly, the fermenting adjusted milk composition forms a viscous mass in the fermenter followed by a pronounced thinning effect that occurs for the duration of the filling period. In this regard, agitation, e.g., side sweep agitation and/or high shear mixing (such as a saw-tooth impeller), within the fermenter may facilitate the thinning effect, while avoiding gel formation. In contrast, when the fermenting adjusted milk composition is held statically with the added rennet solution, gel formation may occur. Some clotted material may form during the thickening process, but the fermented adjusted milk composition stays thin after the thinning process occurs.

In some cases, agitation within the fermenter may be continuous during all or a portion of the filling period, during all or a portion of the dosing or rennet addition period, or combination. In other implementations, once the thickening or the thinning process occurs, e.g., is observed, in the fermenter, agitation may be turned on. For instance, once the thickening process occurs, agitation may be started to begin the process of breaking up any clotted material that may have formed in the enzyme-treated, fermenting adjusted milk composition during the initial thickening process. In examples, a first type of agitation, e.g., side sweep agitation, may be conducted during all or a portion of the dosing period, and a second type of agitation, e.g., high shear mixing, may be conducted alone or in parallel with the first type of agitation. For instance, side sweep agitation may be conducted during the entire dosing period and high shear mixing may be conducted during a last half of the dosing period.

The agitation in the system may additionally or alternatively provide circulation and pumping. For instance a high shear pump may be configured to circulate the enzyme-treated, fermenting adjusted milk composition in the fermenter to turn over the contents of the fermenter one or more times so that any clotted material is broken apart in a high shear zone. For instance, in some cases, clotted material may accumulate a non-circulating fermenter, and in some implementations of the present disclosure, both agitation and circulation via pumping may be implemented to provide sufficient flow and circulation for material shear-thinning by high shear mixing, and movement of any clotted material through a high shear zone of a shear pump to reduce viscosity and facilitate flow based on the shear thinning nature of the product and its lower viscosity. Lower viscosity may assist with better flow to move the product through the high shear zone to break up any clotted material. This may occur for both an external shear pump and also a high shear mixer in the tank.

Shear mixing and/or shear pumping may continue to shear the enzyme-treated, fermenting adjusted milk composition during all or a portion of the fermentation process. The shear mixing and/or shear pumping may also assist with the action of the rennet solution on the casein and with conversion of the lactose present in the enzyme-treated, fermenting adjusted milk composition into lactic acid, resulting in a drop in pH. Upon the enzyme-treated, fermenting adjusted milk composition dropping to a target pH of about 4.8 to 5.8 from a starting pH of about 6.5 to about 6.3, the enzyme-treated, fermenting adjusted milk composition may be a fermentate 260, e.g., an enzyme-treated, fermented adjusted milk composition (See FIG. 1B).

The fermenting adjusted milk composition or the fermentate may be heat treated by heating to about 100° F. to about 125° F. in the fermenter, such as at least about 105° F. In examples, the heating may occur after all or a portion of a fermentation period of the fermenting adjusted milk composition or the fermentate, and heating may be to at least 105° F. During heat treatment, the composition may be sheared as disclosed herein. For instance, the fermentate may form a smooth, homogenous product, with minimal or no clotted or curd-like material, and minimal or no butterfat cream layer at the top of the fermenter that could have originally formed from the action of the rennet enzyme on the casein in the fermenter. Heat treatment may additionally control pH of the fermentate and downstream products. In some examples, heating of the fermenting adjusted milk composition or the fermentate may be conducted at an end of a fermentation period to thereby retain cultures in the fermentation tank during the fermentation period and cease fermentation thereafter. For instance, mesophilic cultures may be maintained at a fermentation temperature of 86° F. during the fermentation period, and heating to elevated temperatures above this temperature may cease the activity of the culture. In some cases, heating may be initiated after the dosing period has ended, e.g., upon reaching the target pH, and just prior to the end of the fermentation period to stop the pH from dropping.

Surprisingly, it has been discovered that injection of the rennet solution over the dosing or rennet addition period, e.g., during all or a portion of the tank filling period, yields a fermentate with no formation of a butterfat cream layer at the top of the fermenter. This is in contrast to adding the rennet solution in a single dose after the filling period, which results in a butterfat cream layer. In addition, formation of a smooth, homogenous fermentate by heating is also surprising compared to conventional natural cheese making processes, where the conventional components are typically cooked to remove moisture from the cheese curds, creating more insoluble protein by the formation of insoluble cheese curds in an inhomogeneous mixture of curds and whey. In contrast, heating the fermentate according to the present disclosure, increases the solubility of the protein present in the fermentate. Further, dosing the rennet solution during the filling period and during the fermentation process thereafter yields a fermentate with a higher evaporative capacity where additional moisture can be driven off during the moisture adjustment phase (e.g., in a wipe film evaporation) and at a faster rate and/or to a greater degree without seeing oiling-off/phase separation of the intermediate product and/or ingredient cheese exiting the evaporator.

Split Fermentate Processing

According to further implementations, prior to addition of the adjusted milk composition to the fermenter, the adjusted milk composition may optionally be split into multiple streams, e.g., fed into multiple infeed lines, where the adjusted milk composition may be fed into a secondary fermenter, in addition to the fermenter, referred to as a primary fermenter. The secondary fermenter may receive the same or different lactic acid-producing bacteria for fermenting compared to the primary fermenter. In addition, the same or different enzymes may be added. Further, non-lactic-acid producing bacteria/secondary cultures may be added to the secondary fermenter, for instance for flavor development of end products. Splitting the adjusted milk composition into multiple fermenters may facilitate producing fermentates and end products with different flavor or textures, may improve food safety, or may achieve other product performance objectives. The fermenters may be filled in parallel or in series and fermentation may occur in batches, and fed-batches.

In some implementations, a secondary fermenter may be subjected to a filling period and a dosing or rennet addition period, shearing, and heat treatment, as described herein. For instance, the secondary fermenter may include the same or a different filling period as the primary fermenter, for instance depending on the total target fill of the secondary fermenter or its capacity compared to the primary fermenter. In addition, the secondary fermenter may include the same or a different dosing or rennet addition period as the primary fermenter, for instance, depending on a target viscosity, flavor and/or texture of the secondary fermentate. Shearing and heat treatment may also be the same or vary based on the target composition and/or properties of the secondary fermentate. It will be appreciated that two or more fermentates may be produced using the adjusted milk composition using two or more fermenters (e.g., three, four, five, or more fermenters) which may also be used to produce fermentates according to the present disclosure.

Figure 2:
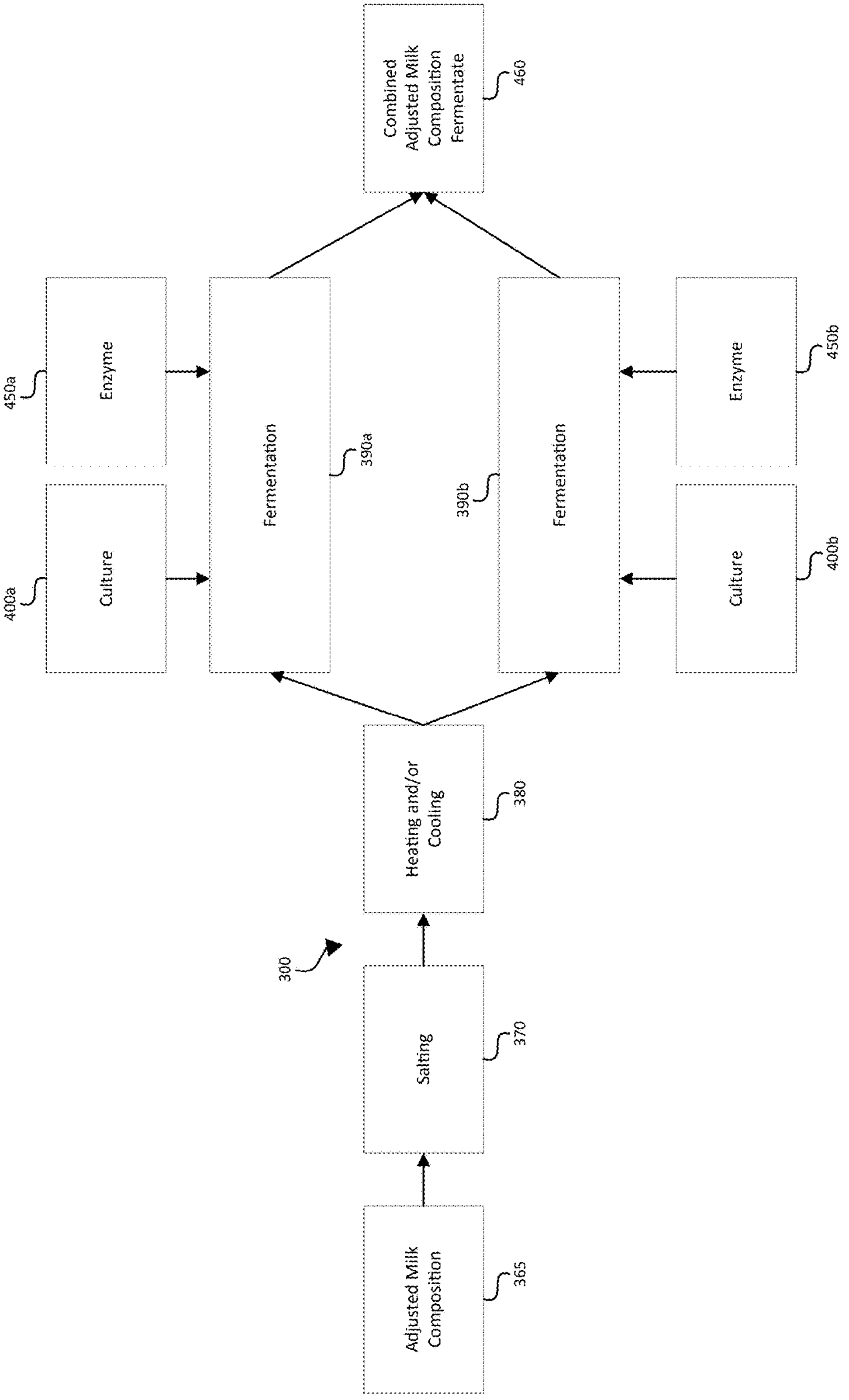
FIG. 2 is a schematic of methods disclosed herein, including split-fed batch processing.

An example of split fermentate processing is provided in FIG. 2. In the method 300, features 365-460 are as described for the similarly numbered elements of FIGS. 1A and 1B (i.e., features 165-260). Elements 110-160 of FIG. 1A, which lead to production of the adjusted milk composition 165 of the method 100 of FIGS. 1A-1D, may be used to produce an adjusted milk composition 365 of the instant method 300. The dairy stream of the present disclosure may be split at any time, and may be split more than once. In the example shown in FIG. 2, an adjusted milk composition 365, which may be salted 370, and may be heat-treated and/or cooled 380, is split into two fermenters, e.g., fermentation tanks, for fermentation 390*a*, 390*b*. Cultures 400*a*, 400*b* may be added to each fermenter, and the cultures may be the same or different for each fermenter. Enzymes 450*a*, 450*b* may be added to each fermenter, and the enzymes may be the same or different for each fermenter. Additional components may be added to each tank as described below, or the fermenters may include only the stream of adjusted milk composition, cultures and enzymes. Alternatively, a fermenter may not include one of a culture or an enzyme. After fermentation or fermentation and enzyme treatment, the split processed fermentates are recombined to produce a combined adjusted milk composition fermentate 460, referred to as a combined fermentate 460.

pH Control during Fermentation and Fermentate Production

According to further implementations, during fermentation 190, a pH of fermenting milk, e.g., the fermenting adjusted milk composition, may be controlled by one or more of adjusting an amount of rennet added, adjusting the milk composition, and/or adjusting an amount of an added starter culture, e.g., relative to an amount of starter culture used in production of the dairy product but without added rennet. For instance, the milk composition in the fermentation tank may have a starting pH of about 6.5 to about 6.3, and during a pH drop to the target pH of about 4.8 to 5.8, the fermenting milk composition may be subjected to the pH control processes provided herein, which may control one or both of the pH drop and the final pH of the fermented product, e.g., the fermentate 260, 460.

Figure 4A:
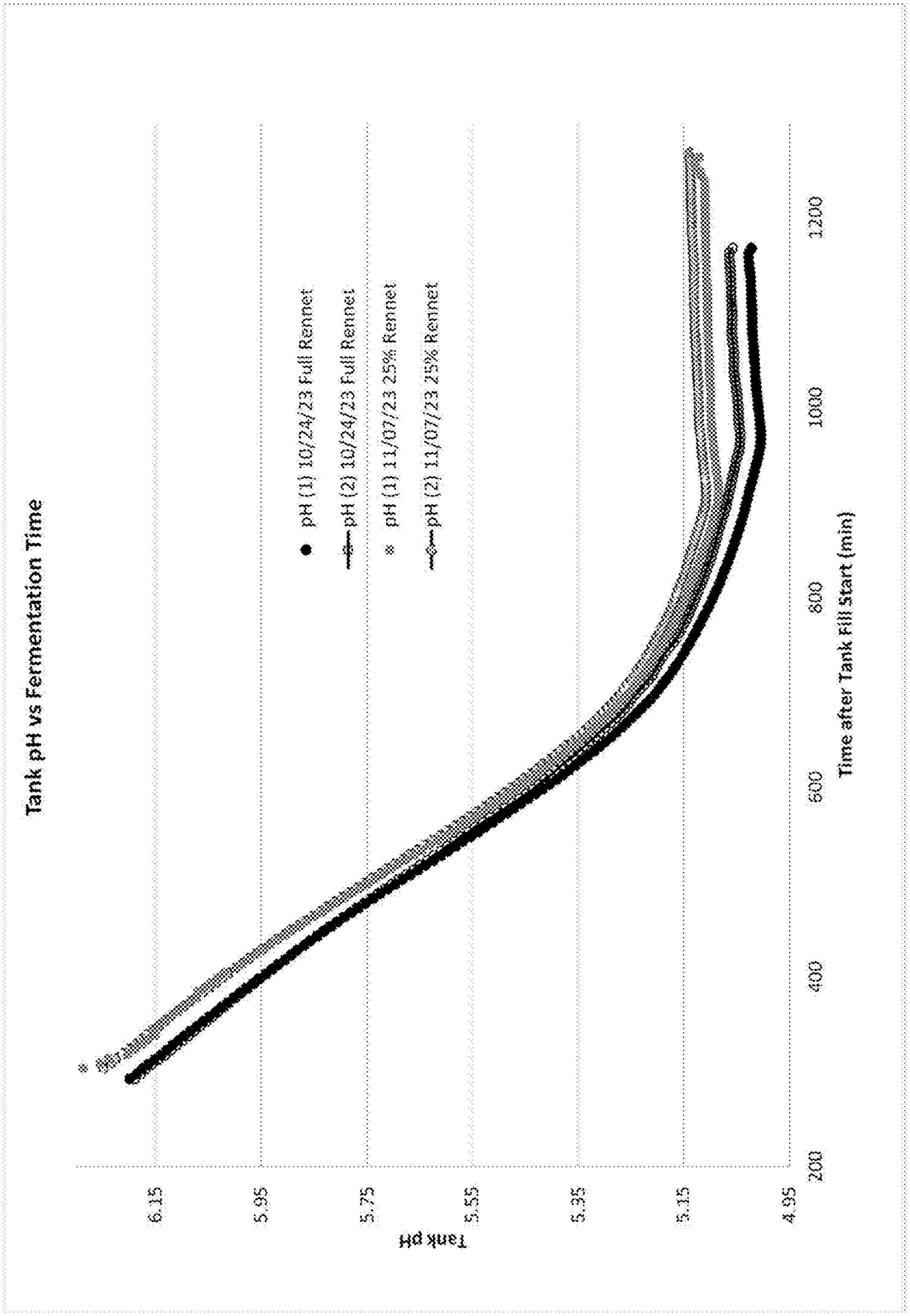
FIGS. 4A and 4B are graphs illustrating the effect of rennet on pH and free hydrogen ions, respectively, in a fermentation tank over time according to embodiments disclosed herein.
Figure 4B:
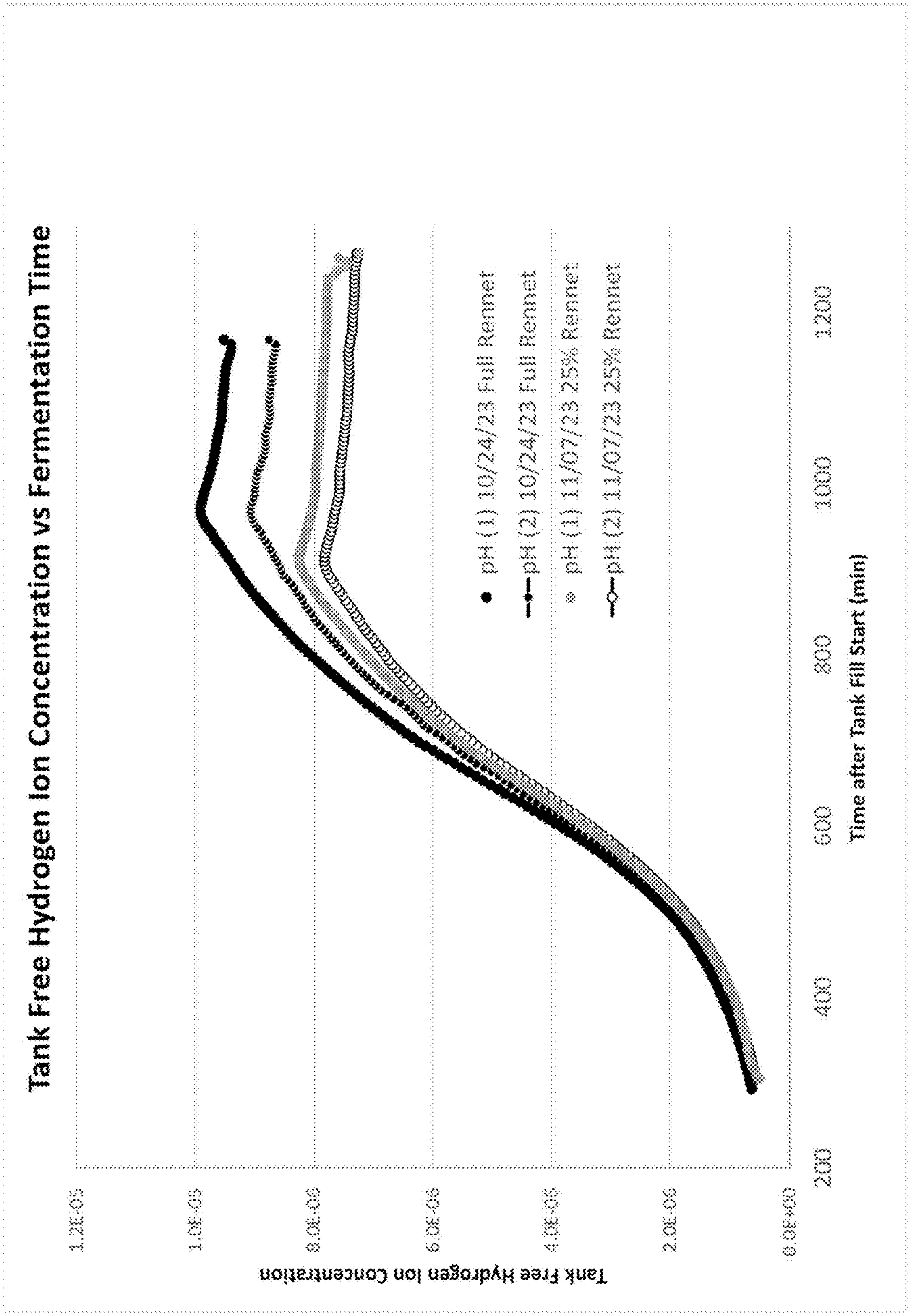

More particularly, fermenting of the milk composition over the filling period causes in situ production of lactic acid and a first pH drop therein, and according to the present disclosure, it has been discovered that this milk composition is caused to undergo a concurrent, second pH drop by the addition of rennet during the filling period due to rennet causing production of free hydrogen ions, which thereby results in the second pH drop. FIGS. 4A and 4B are graphs illustrating this effect of the addition of starter culture and a stream of rennet in fermentation runs of a salted microfiltered milk concentrate containing 0.83% residual lactose in which the final fermented products contained 0% lactose, i.e., all lactose was consumed by the starter culture during the fermentation runs. FIG. 4A illustrates the effect of rennet on pH in a fermentation tank for four fermentation runs in which rennet was added over the filling period. As illustrated, pH dropped from about 6.2 down to a final pH of about 5.04 and 5.05 for two runs 805, 810 receiving a stream of rennet ("full rennet") over the filling period after a fermentation time of about 1000 min or about 16.7 hours, while the other two runs 815, 820 containing 25% of the amount of rennet relative to the other runs reached a final pH of about 5.12 and 5.14. For the runs containing full rennet 805, 810, a target pH range of about 4.8 to 5.8 was also reached faster compared to the other two runs 815, 820. The graph of FIG. 4B shows the free hydrogen ion concentration increases over time, and at a faster rate where the concentration of rennet is increased, thereby causing reduction of pH. As illustrated, free hydrogen ion concentration was greatest for the two runs containing full rennet 805, 810 as compared to the runs containing 25% of the amount of rennet 815, 820 relative to the full rennet runs. Rennet therefore produces a fermentate with lower than expected pH than when the pH is driven down by the fermentation of the fermenting milk composition alone, e.g., by fermentation of residual lactose present in the microfiltered milk composition concentrate alone. Particularly, the addition of starter culture alone in a fermentation run for 0.83% lactose consumption resulted in a pH of about 5.30, meaning the presence of rennet drives down the pH below a level that can be achieved using the starer culture alone. As such modifying pH by the addition of rennet over the filling period is an additional pH modification approach compared to fermentation of lactose to lactic acid.

Accordingly, the addition of rennet to the fermenting milk composition in a continuous or an intermittent stream during the filling period may be used to select and/or control the pH in the fermenting milk composition. For instance, adjusting a rate of pH drop or a final pH may involve adjusting a concentration of the added rennet in fermentation tank. In some cases, a first concentration of rennet is added during a first portion of the filling period, and a second concentration of rennet different from the first is added during a second portion of the filling period. The added second concentration of rennet changes a rate of pH change while the adjusted milk composition is fermented compared to a rate of pH change of the first concentration. In some cases, the addition of rennet at the selected concentration may continue after the filling period ends. As provided herein, the rennet may be dosed, e.g., injected as pre-defined doses, while being added in a continuous or intermittent stream, and the various concentrations of rennet liquid concentrate may range from about 0.00066 wt % to about 0.02 wt % of the adjusted milk composition. Modifying the total rennet concentration added during fermentation may involve modifying the amount of rennet added per dose or in the stream, modifying a frequency of the addition of rennet, and combinations thereof.

In addition or alternatively, the pH in the milk composition may be controlled by adjusting the milk composition to a different protein-to-fat ratio or a reduced lactose-to-fat ratio relative to a composition of milk prior to its addition to the fermentation tank, e.g., prior to fermentation, to thereby adjust an amount of lactose available for fermentation to lactic acid in the adjusted milk composition relative to the amount of lactose available milk. For instance, after a portion of the milk, e.g., the adjusted milk composition, is added to the fermentation tank during a first portion of the filling period, a modified or adjusted milk composition may be added to the fermentation tank during another, second portion of the filling period. The modified or adjusted milk composition may have a different composition, such as a reduced protein-to-fat ratio or a reduced lactose-to-fat ratio, relative to the composition added during the first portion of the filling period. A reduced lactose-to-fat ratio relative to milk may reduce a rate or amount of in situ production of lactic acid due to the reduced availability of lactose for conversion to lactic acid, while an increased lactose-to-fat ratio may increase the availability of lactose to increase a rate or amount of in situ production of lactic acid. Accordingly, in some cases, lactose may be added to the milk composition.

In addition or alternatively, the amount of an added starter culture may be modified, e.g., increased or reduced, relative to an amount of starter culture used in production of the dairy product but without added rennet. For instance, a reduced amount of starter culture added to the fermentation tank may result in conversion of a portion but not all of the available lactose into lactic acid, such as leaving about 0.01 to about 0.5%, or about 0.05 to about 0.4%, or 0.1 to about 0.3% of the available lactose unconverted after completion of fermentation. In some examples, the starter culture may convert about 30 to about 80%, about 40 to about 60%, or about 45 to about 55% of the available lactose in the milk composition. For instance, in the example where 0.83% residual lactose is present in the adjusted milk composition prior to fermentation, the starter culture may be added in an amount that results in conversion of about 0.33% of the residual lactose, leaving about 0.40% residual lactose in the fermentate. Leaving a portion of lactose in its native form after fermentation may offset a pH drop caused by the addition of rennet. In some cases, using a selected amount of starter culture may result in counterbalancing the pH reduction effect of the rennet by about 0.1 to about 0.4, about 0.2 to about 0.3, or about 0.3 to about 0.4 pH units. Alternatively, excess amounts of the starter culture may be added to ensure all available lactose is converted to lactic acid.

Due to the simultaneous influence of rennet and starter culture on the pH of the fermenting composition, implementations of the present disclosure may account for rennet's pH influence by adjusting rennet, adjusting lactose availability and/or adjusting the amount of starter culture added to the fermentation tank, as provided herein.

For instance, a projected pH drop due to the addition of rennet over the filling period may be determined based in part on the concentration of the rennet to be added to the fermentation tank and/or total amount to be added. In further implementations, a projected pH drop due to the simultaneous influence of rennet and starter culture on the pH may be determined based in part on the concentration of the rennet and starter culture to be added to the fermentation tank and/or total amount to be added. In yet further implementations, a projected pH drop due to the influence of the starter culture on the pH may be determined based in part on the concentration of the starter culture to be added to the fermentation tank and/or total amount to be added. One or more of these determined pH drops may then be used to adjust the amount of starter culture, available lactose, the rennet concentration and/or the amount of rennet to be added to account for rennet's pH influence on the fermenting milk composition. Such pH drop determination(s) may be made prior to and/or during filling of the fermentation tank, and accordingly adjustments to the fermentation tank inputs may be made prior to and throughout the filling period.

In such cases, where a pH drop determination is below the target pH, then for example, the milk composition may be adjusted to remove lactose therefrom, e.g., by any of the milk composition adjustment processes disclosed herein such as increasing diafiltration water during the microfiltration process, which removes lactose from the milk composition such that less lactose is available for the starter culture to ferment upon addition to the fermentation tank. In addition or alternatively, the amount of starter culture and/or rennet added to the fermentation tank may be reduced. In other cases, where the pH determination is above the target pH, then for example, a level lactose, rennet and/or starter culture may be increased as provided herein.

Upon dropping to the target pH of about 4.8 to 5.8, the fermenting adjusted milk composition may be a fermentate 260, 460, e.g., an enzyme-treated, fermented adjusted milk composition (See FIGS. 1B and 2), and may be subjected to the further processes provided herein.

Production of Fermentate Products

The fermentate 260, e.g., the heat treated homogenous fermentate, or combined fermentate 460, may be a final product or may be further processed to produce one or more dairy products disclosed herein. For instance, the fermentate 260, 460 may be blended, moisture adjusted (e.g., via evaporation), cooked, packaged, and/or cooled.

With respect to optionally combining the fermentate 260 with one fermentate or other fermentates to produce the combined fermentate 460, the combination may occur before or after additional processing.

With respect to blending the fermentate 260, 460, the fermentate may be blended with components including but not limited to, dairy powders (e.g., buttermilk powder), milkfat (e.g., concentrated milk fat (CMF)), salt, lactic acid, added cheese (e.g., natural, process, enzyme modified cheese, and combinations), sorbic acid, cultured pasteurized milk, skim milk, whole milk, whey, sweet whey, or their dried equivalents, milk minerals, sugar, and/or water. The components may additionally include vegetables or vegetable components, meats and/or meat flavoring, and/or flavor additives, chelators and/or hydrocolloids. In embodiments, where added cheese is included, the cheese may comprise a blend of two, three, four or more cheese varieties, one or more of which may be natural or processed. Example cheese varieties include, but are not limited to, cheddar, Gouda, Swiss, pepper jack, mozzarella, Muenster, cotija, and/or Monterey jack. Product components may also include plant-based components such as canola, sunflower, and/or soy products, which may be provided in the form of various extracts, powders and/or oils. Other components may include natural flavors, emulsifying salts (sodium citrate, sodium phosphate and/or trisodium phosphate), and dairy derived emulsifying salts derived from the starting milk compositions. The blended components with the fermentate may be used to produce an enzyme modified cheese, for example. In some cases, any of the aforementioned components may be excluded from the compositions of the present disclosure.

Moisture adjusting the fermentate 260, 460, alone or in combination with various components, may involve feeding the fermentate to an evaporator vessel where moisture in the composition is evaporated to form a concentrated composition with a reduced moisture content. In some implementations, the evaporator vessel may be configured as a vacuum chamber and may be operated under vacuum pressure below standard atmospheric pressure, for instance from about 16 inHg to about 29.5 inHg (which corresponds to about 176° F. to 53° F. boiling point of water), or from about 20 inHg to about 28 inHg, or from about 24 inHg to about 29.92 inHg, or about 28 inHg. In the evaporator vessel, the composition may be continuously transferred by blades, such as by a mutator/wiper shaft of a wiped film evaporator or a scraped surface heat exchanger, to form a thin film while maintaining the composition at the evaporation temperatures via heat transfer walls. Concentrating via wiped film evaporation may facilitate production of ingredient cheese, which may be a finished product, or may be used subsequent production of process cheese.

Following moisture removal, the moisture-adjusted fermentate 260, 460 may be blended with one or more of the various components disclosed herein above. For instance, the moisture-adjusted fermentate 260, 460 may optionally be blended with components such as dairy ingredients (dairy powders, milk fat), salt and water, enzyme modified cheese, natural flavors. For instance, the additional components may facilitate production of a cheese preblend used for the production of process cheese products.

The fermentate 260, 460, with or without moisture-adjustment and blending, may be subjected to cooking, and steam may be injected into a cooker, e.g., a kettle-type cooker. Emulsifying salts or other components may optionally be added to the cooker and may be further blended, for example to produce a pasteurized process cheese, spread, or product. In some examples, direct steam addition into the cooker may cook the fermentate to pasteurization temperatures and held in the cooker to achieve pasteurization.

The fermentate 260, 460, with or without moisture-adjustment, blending and cooking, may be sealed or packaged and stored at refrigeration temperatures, e.g., about 39° F. (4° C.). In implementations where the finished cheese sauce product is not heated to temperatures required for pasteurization and/or not held at the temperature for the pasteurization time, the product may be characterized as a heat-treated cheese sauce product.

Figure 3:
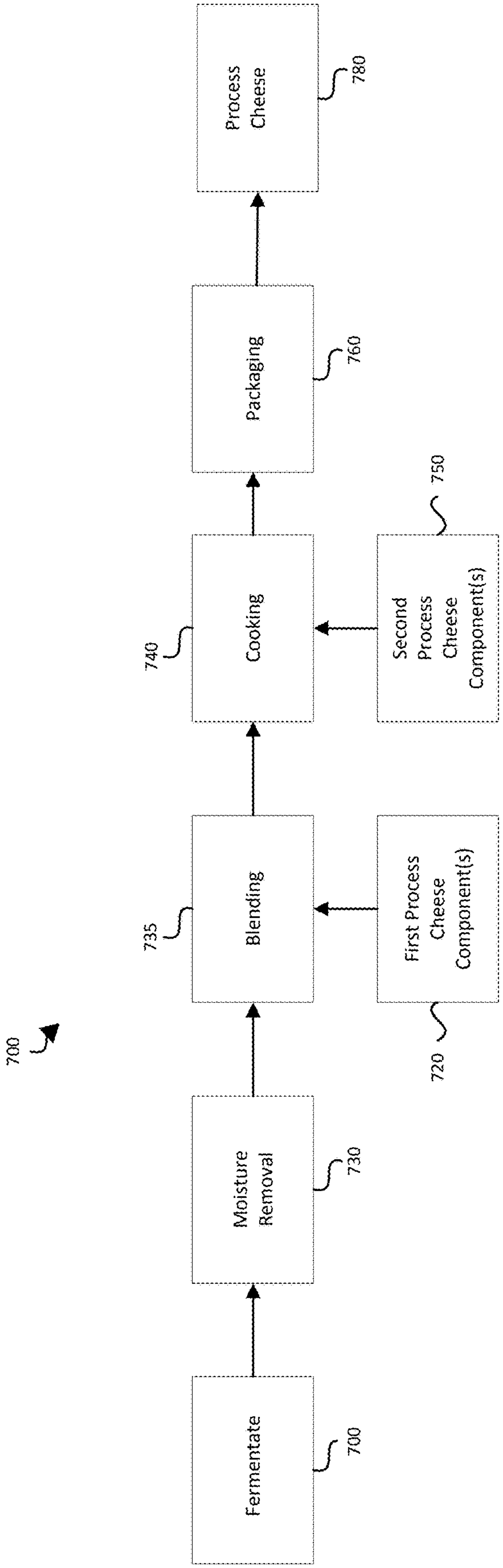
FIG. 3 is a schematic of a method of making process cheese products according to embodiments disclosed herein.

A method of making a process cheese product, such as a spread or other product, is presented in FIG. 3. In the method 700, a fermentate product 710, which may be the fermentate 260, 460 as disclosed herein, is shown as a starting material, but the method 700 may be continuous or semi-continuous with previously disclosed methods 100, 300. The fermentate product 710 may be subjected to moisture removal 730 to reduce moisture content and/or increase total solids content. Moisture removal may include one or more of reverse osmosis and evaporation, which may be wiped film evaporation, as described above. The concentrated fermentate product may then be blended 735, which may be with one or more components, e.g., first process cheese components 720, such as salt, lactic acid, and dairy powders, as described above. The blended, concentrated fermentate product may be subjected to one or more cooking steps 740, as described herein. When the dairy product is a pasteurized product, the cooking step 740 may involve heating to pasteurization temperatures. One or more other components, e.g., second process cheese components 750, such as steam, emulsifying salts, and/or other ingredients, such as condiments, may be added before or during cooking 740. The cooked fermentate product may then be packaged 760 to produce a process cheese 780 such as a process cheese loaf, a process cheese spread, ingredient cheese, cheese sauces, heat-treated cheese sauces, pasteurized cheese sauces, process cheese, pasteurized process cheese, dairy spreads, pasteurized process cheese spreads, pasteurized process cheese products, pasteurized process cheese food, pasteurized process cheese product or pasteurized blended cheese, and precursors or intermediates to production of any of the foregoing. In some implementations, prior to packaging, the cooked fermentate product may be spread as a molten product in a sheet like manner on chilled belts for rapid cooling to produce slice on slice cheese products as the process cheese 780. In other examples, the cooked fermentate product may be formed into blocks, added to vessels, further processed, and so on, to yield the process cheese 780.

Dairy products produced according to the present disclosure including, process cheese produced using the disclosed fermentate(s), have similar performance characteristics both during processing and as a finished product compared to conventional methods used to manufacture process cheese by using aged barrel or block cheese ingredients. Accordingly, production processes according to the present disclosure may avoid having to use aged barrel or block cheese ingredient inputs to produce the process cheese products.

Further, as explained briefly above, production of process cheese according to the present disclosure, but modified such that the entire quantity of the rennet solution is added at the end of the fermentation tank filling process. Such an approach may provide similar product performance characteristics however, the fermenting material would have a pronounced thickening effect that would require more torque and power requirements for tank agitators and that increases the cost of fermentation tanks to manage this phenomenon. Another effect that has been observed when the entire rennet solution is added at the end of the fermentation tank filling process is that there is a more pronounced butterfat or cream layer that forms at the top of the fermentation tank during the fermentation process. While this butterfat or cream layer can be reincorporated into the adjusted milk composition by shear and heating, it has been discovered that by injecting the rennet solution in doses during the filling process, surprisingly, the formation of the butterfat cream layer does not occur.

Advantages over prior approaches are due to the ability to continuously produce the fermentate(s) and subsequent cheese products of the present disclosure, which can avoid the use of aged barrel or block ingredient cheese that typically require additional transportation, storage, handling, and packaging costs, as inputs into finished products. In addition, in traditional processes, a trained cheese grader is typically required to flavor grade the barrel cheese and determine its disposition, which may be reduced or eliminated according to the approaches of the present disclosure. Furthermore, barrel cheese may have defects (e.g., surface mold, excess syneresis, poor body or flavor) that can create waste and/or limit its usage in process cheese production, which may be avoided by production of products according to the present disclosure. Ingredient cheese used in the more conventional approach to produce process cheese also generally requires an aging period of at least 14 days so the ingredient cheese protein can adequately break down and allow sufficient colloidal calcium solubilization to facilitate the ingredient cheese protein to emulsify the fat during the process cheese manufacturing process. Without the aging period, protein does not sufficiently breakdown and calcium does not solubilize prior to use, and the ingredient cheese used with the conventional process can cause oiling off during processing, yield thick, short and heavy molten process cheese during processing, producing excessively firm, less flavorful and melt restricted or less preferred melting finished process cheese. In contrast, implementations of the present disclosure may result in the production of dairy products in a continuous, nearly continuous, or semi-continuous manner, and the products may be packaged within a timeframe of 24 hours after milk standardization and pasteurization.

Further, having the rennet solution interact with the cheese protein during the fermentation process, it has been discovered that during the evaporation step, more moisture can be evaporated to achieve a higher solids content for the cheese ingredient, without having oiling off occur with the evaporated cheese ingredient exiting the evaporation process. Conversely, the processes may achieve an increased throughput/production of the evaporated cheese ingredient for the same total solids content through the evaporator. This comparison can be based on whether no rennet solution is added at all, or if it is added immediately prior to the adjusted milk composition entering the wiped film evaporator, the latter of which is a typical way of adding rennet to products manufactured in this manner. Dosing the rennet solution during the filling period and during the fermentation process thereafter yields a fermentate with a higher evaporative capacity where additional moisture can be driven off during the wipe film evaporation process at a significantly faster rate and/or to a significantly greater degree without seeing oiling off/phase separation of the ingredient cheese exiting the wipe film evaporator.

An additional potential advantage of dosing rennet during the filling period and the fermentation process relates to its impact on increasing the evaporative potential of the fermentate is that one would also have the option of producing a lower solids/higher moisture adjusted milk composition (e.g., via microfiltration of the starting milk composition) and may allow the moisture adjustment (e.g., wipe film evaporation process) to more easily make up the difference. A lower solids adjusted milk composition may allow a smaller microfiltration system to be used, or less energy may be required for the microfiltration process since there would be less work and membrane surface area required when less permeate is removed from the process.

Moreover, dosing rennet during the filling period and/or during the fermentation process as opposed to an injection of the rennet immediately prior to evaporation, the former doesn't yield an ingredient cheese having a gritty/grainy texture that can carry over into the finished process cheese that has been experienced with the latter noted approach. It is believed that the gritty/grainy texture formation may be attributed, in part or in conjunction with, the rennet addition at the lower pH of the fermentate. The lower pH addition is a consequence of the rennet solution being added immediately before evaporation. When the rennet is dosed during the filling period and the fermentation process, the rennet's action on the protein occurs earlier in the process and at higher pH. A lower pH addition point and in conjunction with rennet action occurring in a vacuum environment during the evaporation process may promote undesirable protein denaturation and/or aggregation due to the addition of the rennet immediately prior to evaporation and/or the interaction of rennet reaction products with higher soluble calcium that would be present at the lower pH addition point relative to earlier in the process at higher pH and less soluble calcium present.

Process Cheese Products

Process cheese products may be formed of, or contain, the fermentate(s), e.g., fermentate 260 or 460, of the present disclosure. For example, the fermentate(s) may account for about 25 to about 94 wt % of such products. The amount of fermentate(s) may vary, and may depend on factors such as the specifically desired flavor, and/or nutritional value of a particular process cheese or process cheese spread product, and/or naming of the product (e.g., pasteurized process cheese spread requires a minimum of 51% cheese ingredient input). In some examples, the fermentate(s) content of such products account for substantially all of the product, or may range from about 25 wt % to about 90 wt %, 30 wt % to about 90 wt %, about 50 wt % to about 90 wt %, about 60 wt % to about 90 wt %, about 80 wt % to about 90 wt %, about 85 wt % to about 94 wt %, about 90 wt %, about 94 wt %, about 94 wt %, 25 wt % to about 60 wt %, about 30 wt % to about 60 wt %, about 25 wt % to about 45 wt %, about 25 wt % to about 35 wt %, about 35 wt % to about 55 wt %, about 40 wt % to about 50 wt %, about 42 wt % to about 48 wt %, or about 43 wt % to about 45 wt % of the product.

Other components of the process cheese or process cheese spread products may include the components described herein.

The process cheese products may be solid at room temperature, while process cheese spread products may be non-solid at refrigeration and room temperatures and may be spreadable at these temperatures. For example, the non-solid physical state of the process cheese spread composition may be defined by a viscosity greater than that of a liquid, but less than a solid. For example, the cheese spread products may have a thick consistency at room temperature, e.g., about 68° F. (20° C.) to about 77° F. (25° C.), with a viscosity ranging from about 100,000 cPs to about 160,000 cPs, depending on the exact temperature. The non-solid state of the process cheese spread products may be further characterized by the composition being spreadable at refrigeration temperatures, and at room temperature the composition cannot be readily poured from a container.

A moisture level of the process cheese products, e.g., process cheese loaf products, may range from about 35 wt % to about 45 wt %, such as about 36 wt % to about 45 wt %, about 40 wt % to about 45 wt %, about 42 wt % to about 45 wt %. For example, block process cheese may have a moisture range of about 35 wt % to about 40 wt %, while sliced, or slice on slice, process cheese may have a moisture range of about 40 wt % to about 45 wt %. A moisture level of the process cheese spread products may range from about 48 wt % to about 60 wt %, such as about 50 wt % to about 60 wt %, about 52 wt % to about 60 wt %, or about 54 wt % to about 60 wt %, about 48 wt % to about 55 wt %, about 48 wt % to about 52 wt %, or about 48 wt % to about 51 wt %. In some implementations, the moisture may be derived solely from the fermentate(s), or some moisture may be added moisture (e.g., in the form of a liquid such as water, water from condensing steam from a direct steam injection cooking process, or a dairy component such as milk or cream). Moisture levels may impact product viscosity, such that the greater the moisture level, the less viscous, and vice-versa. A moisture level of the cheese sauce products may range from about 55 wt % to about 65 wt %, about 45 wt % to about 70 wt %, about 50 wt % to about 70 wt %, about 50 wt % to about 60 wt %, about 60 wt % to about 70 wt %, or about 50, 52, 55, 58, 60, 52, 65, 67, or 70 wt % of the cheese sauce product.

Salt may be included in the process cheese, and the amount may depend on the desired taste and/or nutritional content of the product. For example, low-sodium or reduced sodium varieties may include less salt than other varieties. In various embodiments, the salt content of the products may range from about 0.1 wt % to about 3 wt %, about 0.2 wt % to about 2 wt %, or about 0.3 wt % to about 0.8 wt %.

Dairy Derived Emulsifying Salts

In some implementations, dairy derived emulsifying salts may be included to reduce or omit addition of emulsifying salts in final products. For instance, dairy derived emulsifying salts may be derived from an ultrafiltration permeate of the disclosed milk compositions or other dairy streams. The ultrafiltration permeate may be subjected to further processing such as the removal of monovalent ions, e.g., through nanofiltration, and subjecting the depleted ion stream to ion exchange, such as a sodium containing ion exchange column with sodium containing eluting solution, to produce sodium phosphate and sodium citrate. Such dairy derived emulsifying salts may also have calcium removed using ion exchange, e.g., an ion exchange column. Systems and methods for producing dairy derived emulsifying salts from a dairy stream are disclosed in co-owned U.S. Pat. No. 11,337,435, which is incorporated herein by reference for any useful purpose. Dairy derived emulsifying salts may act similarly upon the casein by allowing the exposure of hydrophobic and hydrophilic sites to facilitate emulsification. In some implementations, where the milk compositions are subjected to microfiltration, the microfiltration permeate may be further subjected to the aforementioned processes for isolating dairy derived emulsifying salts. When captured from a permeate of the initial milk composition stream, the use of such native emulsifying salts may provide a cleaner label. The ability to further separate, precipitate and concentrate down dairy derived emulsifying salts within a separate stream of the processes of the present disclosure could allow for addition back at various stages of production, such as at a cooker in the manufacture of process cheese, spread, or sauces.

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates, or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. In some instances, the term "about" includes values up to and including 10% less than and 10% greater than the recited value.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A method of producing a dairy product, the method comprising:

causing a milk composition to be fermented over a filling period in which a fermentation tank is gradually filled with the milk composition, wherein in situ production of lactic acid results in a first pH drop in the fermenting milk composition; and causing the milk composition to undergo a concurrent, second pH drop by adding rennet to the fermenting milk composition in a continuous or an intermittent stream during the filling period, wherein the rennet causes production of free hydrogen ions to thereby cause the second pH drop.

2. The method of claim 1, further comprising adjusting a rate of pH drop or a final pH by adjusting a concentration of the added rennet in the continuous or intermittent stream.

3. The method of claim 1, wherein prior to causing the milk composition to be fermented, further comprising adjusting the milk composition to a different protein-to-fat ratio or a different lactose-to-fat ratio relative to a composition of milk.

4. The method of claim 1, further comprising:

determining a projected pH drop at least by the added rennet; and based on the determination, modifying a rate of pH drop or a final pH by one or more of: adjusting an amount of rennet added, adjusting lactose in the milk composition, or adjusting an amount of an added starter culture.

5. The method of claim 4, further comprising allowing lactose in the milk composition to be fermented to a final pH thereby forming a fermentate, wherein the fermentate includes a residual amount of lactose.

6. The method of claim 4, wherein the projected pH drop is further determined by addition of a starter culture to cause the in situ production of lactic acid.

7. The method of claim 3, further comprising:

determining a projected pH drop in the fermenting milk composition at least by addition of a starter culture; and based on the determination, modifying a rate of pH drop or a final pH by one or more of: adjusting an amount of rennet added, adjusting lactose in the milk composition, or adjusting an amount of an added starter culture.

* * * * *